US008657722B2

(12) United States Patent
Shioura

(10) Patent No.: US 8,657,722 B2

(45) Date of Patent: Feb. 25, 2014

(54) CONTROL APPARATUS OF INTERNAL COMBUSTION ENGINE

(75) Inventor: Yuichiro Shioura, Shizuozka (JP)

(73) Assignee: Suzuki Motor Corporation, Shizuoka (JP)

( * ) Notice: Subject to any disclaimer, the term of this patent is extended or adjusted under 35 U.S.C. 154(b) by 624 days.

(21) Appl. No.: 12/987,438

(22) Filed: Jan. 10, 2011

(65) Prior Publication Data

US 2011/0172057 A1 Jul. 14, 2011

(30) Foreign Application Priority Data

Jan. 13, 2010 (JP) ................................ 2010-005121

(51) Int. Cl.
*B60W 10/04* (2006.01)

(52) U.S. Cl.
USPC .......................................... 477/187; 477/906

(58) Field of Classification Search
USPC ........................................................ 477/187
See application file for complete search history.

(56) References Cited

U.S. PATENT DOCUMENTS

| | | | |
|---|---|---|---|
| 5,411,452 | A | 5/1995 | Katayama |
| 6,209,518 | B1 | 4/2001 | Machida et al. |
| 2007/0027609 | A1 | 2/2007 | Watanabe |
| 2008/0207395 | A1 | 8/2008 | Tanaka |

FOREIGN PATENT DOCUMENTS

| | | |
|---|---|---|
| CN | 101111700 A | 1/2008 |
| DE | 3804012 | 8/1989 |
| JP | 09-287488 | 11/1997 |
| JP | 3820643 | 3/1998 |
| JP | 11-343909 | 12/1999 |
| JP | 3547619 | 12/1999 |
| JP | 3464918 | 2/2000 |
| JP | 2002235595 | 8/2002 |
| JP | 2007198159 | 8/2007 |

OTHER PUBLICATIONS

German Office Action (with English translation) dated Sep. 17, 2012, which issued during the prosecution of German Patent Application No. 10 2011 000 117.4.

Chinese Office Action, dated Mar. 27, 2013, which issued during the prosecution of Chinese Patent Application No. 201110025065.8, which corresponds to the present application.

*Primary Examiner* — Erin D Bishop

(74) *Attorney, Agent, or Firm* — Troutman Sanders LLP

(57) ABSTRACT

In a control apparatus of an internal combustion engine having an electronic throttle system driving an actuator so that a throttle valve provided in the internal combustion engine is at a target opening according to driving conditions, a throttle opening is turned to a limp home opening when abnormality is detected in the driving conditions so as to allow retreat traveling of a vehicle. The control apparatus of the internal combustion engine includes a brake operation detecting unit detecting a brake operation, in which when a brake operation is added subsequently while the accelerator pedal is operated, the control apparatus sets the target opening to the limp home opening based on occurrence of a sequence of the operations, and drives the actuator so that the throttle opening turns to the limp home opening, regardless of whether abnormality is detected or not.

4 Claims, 7 Drawing Sheets

CONTROL APPARATUS OF INTERNAL COMBUSTION ENGINE

CROSS-REFERENCE TO RELATED APPLICATIONS

This application is based upon and claims the benefit of priority of the prior Japanese Patent Application No. 2010-005121, filed on Jan. 13, 2010, the entire contents of which are incorporated herein by reference.

BACKGROUND OF THE INVENTION

1. Field of the Invention

The present invention relates to a control apparatus of an internal combustion engine mounted in a vehicle.

The present invention particularly relates to an output control function of a control apparatus to control output of an internal combustion engine having an electronic throttle system based on operating conditions of an accelerator pedal and a brake pedal, which are operated intentionally.

2. Description of the Related Art

A control apparatus of an electronic throttle system takes in an accelerator opening detected by an accelerator sensor (accelerator opening sensor) as an input, and calculates a target throttle opening as a control output based on this accelerator opening or a combination with other conditions.

A throttle is controlled and driven to open and close by a motor so as to correspond (in other words, "converge") to the target throttle opening. An actual driving amount (control amount) of the motor is a difference between an immediately preceding throttle opening position and a target throttle opening position.

In the control apparatus of the electronic throttle system, whether the actual throttle opening corresponds (converges) to the target throttle opening or not is detected with a throttle sensor, and feedback control is performed so that the opening corresponds (converges) thereto.

Further, there is a technique to set the throttle opening to limp home (also called "limp home opening") in case of system failure or abnormal condition, as described in prior arts of Japanese Patent No. 3464918, Japanese Patent No. 3547619, Japanese Patent No. 3820643, Japanese Laid-open Patent Publication No. 11-343909, Japanese Laid-open Patent Publication No. 2002-235595, and Japanese Laid-open Patent Publication No. 2007-198159.

Further, in the above documents, there are techniques to control the throttle opening according to a brake operation. These techniques are to use the brake as an input unit alternative to the accelerator, or to use the brake as a trigger input for stopping the function.

Now, in consideration of the case where the accelerator pedal is caught in a floor mat, or the like, the conventional control apparatus of the internal combustion engine fixes the accelerator opening for control to an IDL opening (approximately equal to full close) when both the accelerator and the brake are pressed down.

However, in the conventional control, when pressing down on the accelerator pedal is not released, the accelerator opening is kept fixed to the IDL opening and causes braking. Accordingly, there is a disadvantage that retreat traveling is not possible in this state.

At this time, when pressing down on the brake pedal is released, acceleration of the vehicle is possible, but the engine output is high according to the accelerator opening caused by the pressing down. Thus, there is a disadvantage that it is very difficult to adjust the speed while switching between the two opposite extreme states.

Further, when determination of braking is performed only with a brake switch as illustrated in FIG. 7, the control would not be able to function when just the brake switch fails. Thus, for reliability of control, there is a disadvantage that there remains uncertainty in determination only with the brake switch.

Further, all of the techniques in the above documents are applied in case of failure (after a failure is determined), or abnormality (after abnormality is determined). Accordingly, there is a disadvantage that the control would not be able to function unless some kind of cause of a problem (specific device) is clearly determined.

That is, only with system components of the conventional electronic throttle systems, it is difficult to judge whether it is a pedal operation amount by an intentional operation or a pedal operation amount based on an accidental external cause such as being caught in a mat. However, increasing and complicating system components of the electronic throttle system by adding a system component, which does not contribute to a normal traveling, just for the purpose of detecting an accidental external cause is also not favorable.

Moreover, also regarding the technique to perform control according to a brake operation, it is still not possible to satisfy all of a traveling state accompanying an intentional operation with both feet, fail safe under an abnormal condition (also called "retreat traveling state"), and wrong pressing (operating both the accelerator and the brake) done unconsciously, or the like.

SUMMARY OF THE INVENTION

The present invention has objects to provide output control capable of handling undetected system abnormality, to perform output control capable of performing retreat traveling, to provide output control to make a highly accurate determination considering a wrong operation by a careless mistake or the like, and to increase the reliability.

Accordingly, to solve the above-described problems, the present invention provides a control apparatus of an internal combustion engine having an electronic throttle system driving an actuator so that a throttle valve provided in the internal combustion engine is at a target opening according to plural driving conditions including an operating amount of an accelerator pedal, in which a throttle opening is turned to a limp home opening when abnormality is detected in any one of the driving conditions so as to allow retreat traveling of a vehicle. The control apparatus of the internal combustion engine includes a brake operation detecting unit detecting an intentional brake operation, in which when a brake operation is added subsequently while the accelerator pedal is operated, the control apparatus sets the target opening to the limp home opening based on occurrence of a sequence of the operations, and drives the actuator so that the throttle opening turns to the limp home opening, regardless of whether abnormality is detected or not.

DETAILED DESCRIPTION OF THE PREFERRED EMBODIMENTS

Hereinafter, embodiments of the present invention will be described in detail with reference to the drawings.

—First Embodiment—

FIG. 1 to FIG. 5 illustrate a first embodiment of the present invention.

Figure 2:
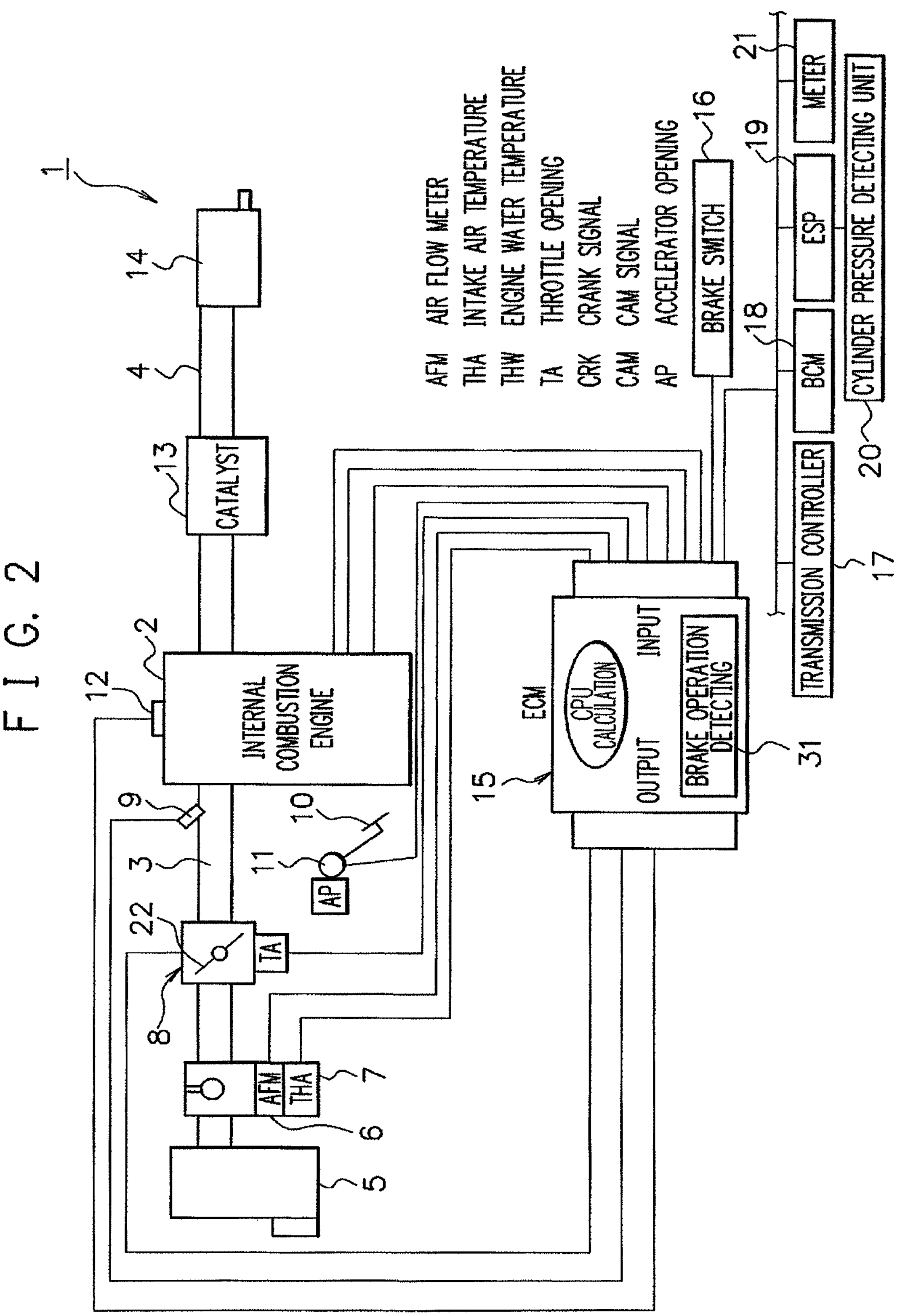
FIG. 2 is a system diagram of the control apparatus of the internal combustion engine (first embodiment)

In FIG. 2, numeral 1 denotes a control apparatus of an internal combustion engine 2.

In this control apparatus 1, as illustrated in FIG. 2, an intake passage 3 is connected to an intake system of the internal combustion engine 2, and an exhaust passage 4 is connected to an exhaust system of the internal combustion engine 2.

An air cleaner 5, an air flow meter (also described as "AFM") 6 and an intake air temperature sensor (also described as a "THA sensor") 7, an electronic throttle system 8 detecting a throttle opening (also called "TA"), and an injector 9 are disposed along the intake passage 3 of the internal combustion engine 2 in this order from an upstream side.

An accelerator opening sensor 11 detecting an accelerator opening (also called "AP") (which can also be described as a "pressing amount") of an accelerator pedal 10 is connected to the electronic throttle system 8.

Further, an ignition coil 12 is disposed in the internal combustion engine 2.

Furthermore, a catalyst 13 and a muffler 14 are disposed along the exhaust passage 4 of the internal combustion engine 2 in this order from an upstream side.

The control apparatus 1 includes a control unit (also called "ECM") 15 performing CPU calculations.

To an input side of this control unit 15, the air flow meter 6, the intake air temperature sensor 7, the electronic throttle system 8, and the accelerator opening sensor 11 are connected. The internal combustion engine 2 is also connected to the input side of the control unit 15, and an engine water temperature (also called "THW"), a crank signal (also called "CRK"), a cam signal (also called "CAM"), and so on are inputted from the internal combustion engine 2.

Further, to the input side of the control apparatus 15, a brake switch 16 provided on a not-illustrated brake pedal, a transmission controller 17, a BCM ("Body Control Module", also called a "vehicle body electronic control unit") 18, an electronic stability control device (also called "ESP") 19, a cylinder pressure detecting unit 20, a meter 21, and so on are connected.

The electronic stability control device (also called "ESP") 19 is a control device having a brake control function. The cylinder pressure detecting unit 20 is connected to the electronic stability control device 19, and detects the pressure of fluid filled in a brake cylinder (not illustrated) provided in connection to the brake pedal as a brake cylinder pressure.

On the other hand, the electronic throttle system 8, the injector 9, and the ignition coil 12 are connected to an output side of the control unit 15.

Figure 3:
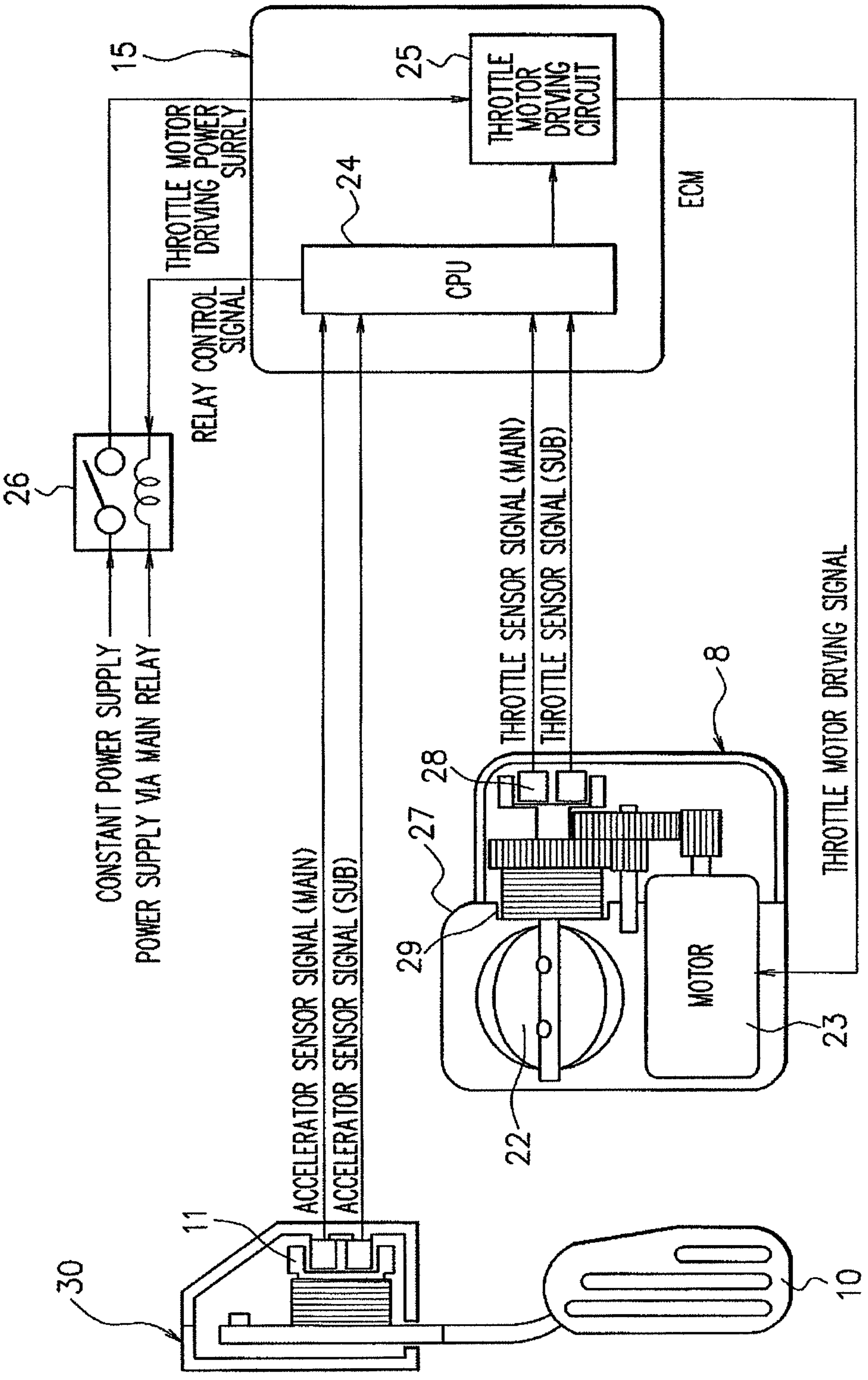
FIG. 3 is a schematic structural diagram of an electronic throttle system (first embodiment)

The electronic throttle system 8 will be described with reference to FIG. 3.

This electronic throttle system 8 drives an actuator (also called a "motor") 23 so that an opening of a throttle valve 22 provided in the internal combustion engine 2 turns to a target opening according to plural driving conditions including the operating amount of the accelerator pedal 10.

The control unit 15 connected to this electronic throttle system 8 has a CPU 24 as a calculating unit and a throttle motor driving circuit 25. A throttle motor relay 26 is connected to the CPU 24 and the throttle motor driving circuit 25. The pressing amount of the accelerator pedal 10 is detected by the accelerator opening sensor 11.

The control unit 15 determines an optimum throttle opening based on the detected accelerator opening and the engine operating state, and drives the actuator 23 incorporated in the throttle body 27 to open and close the throttle valve 22.

In addition, opening information of the throttle valve 22 is detected by a throttle sensor 28 disposed in the throttle body 27 of the electronic throttle system 8 and is fed back to the control unit 15.

Further, control of an idle rotation speed is performed with the electronic throttle.

Furthermore, there are two (main and sub) systems for monitoring system abnormality of the throttle sensor 28 and the accelerator opening sensor 11, so as to achieve improved reliability.

The control unit 15 turns off the throttle motor relay 26 when abnormality is detected. Accordingly, the throttle valve 22 is fixed to an opening of about 7° (which increases or decreases in some degree depending on a vehicle or an engine) from a full close state, that is, a limp home opening (also called "default opening") by a return spring 29.

In addition, when the control unit 15, the throttle body 27, or an accelerator pedal assembly brake switch 1630 of the accelerator pedal 10 is replaced, or a negative cable is removed from a battery (not illustrated), electronic throttle learning has to be performed.

The 'full close position' as criterion for opening is learned in the electronic throttle learning.

Thus, the control apparatus 1 of the internal combustion engine 2 has a structure to turn the throttle opening to the limp home opening when abnormality is detected in some kind of driving conditions, thereby allowing retreat traveling of the vehicle.

The control unit 15 is provided with a brake operation detecting unit 31 detecting an intentional brake operation. The control apparatus 1 has a structure such that when a brake operation is added subsequently while the accelerator pedal 10 is operated, the target opening is set to the limp home opening regardless of presence of detected abnormality based on occurrence of this operating sequence, and the actuator 23 is driven to turn the throttle opening to the limp home opening.

Figure 5:
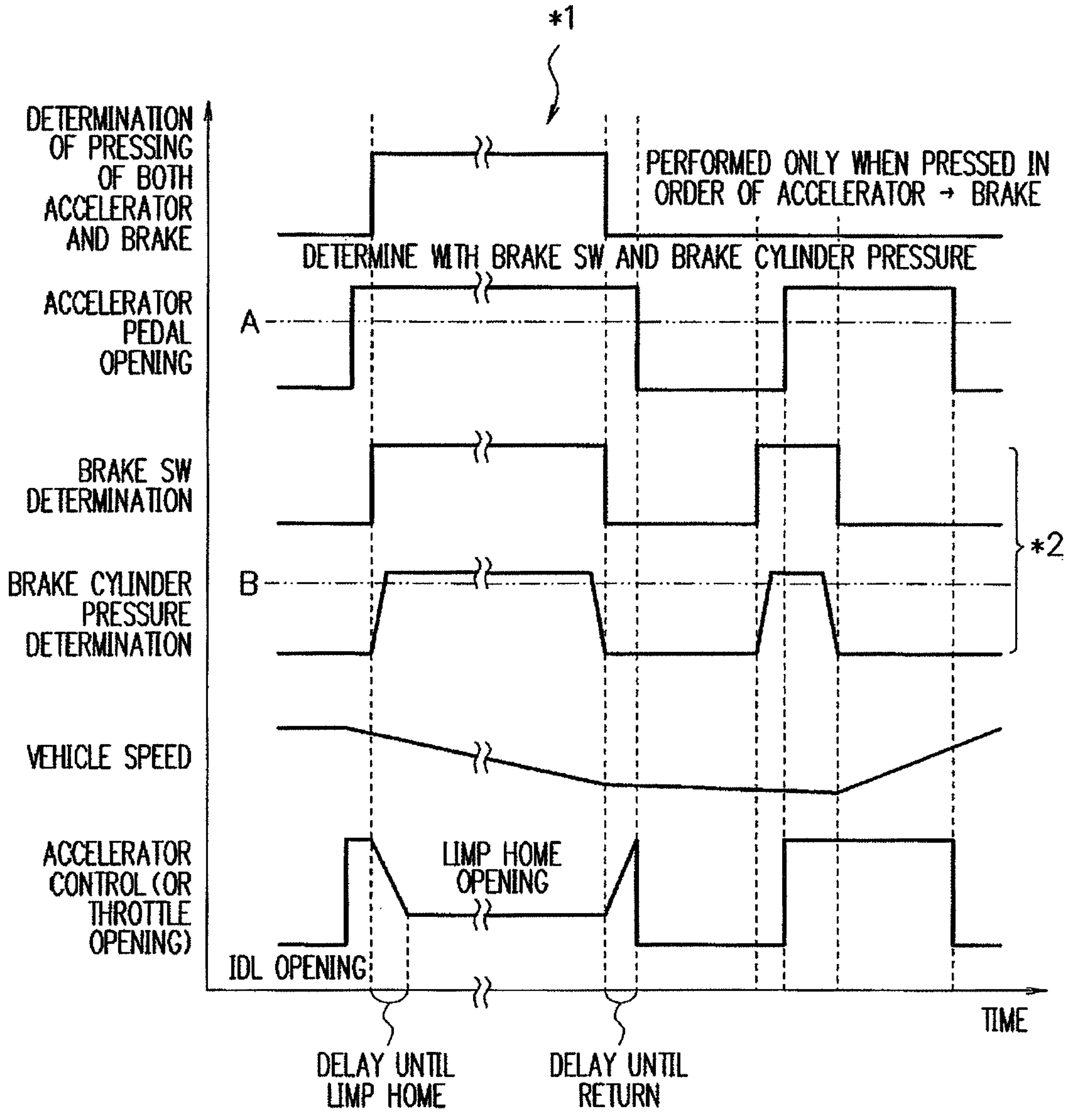
FIG. 5 is a time chart of the control apparatus of the internal combustion engine (first embodiment)

To describe in more detail, as illustrated in FIG. 5, the control apparatus 1 sets, when a brake operation is added subsequently while the accelerator pedal 10 is operated, the target opening to the limp home opening regardless of presence of detected abnormality based on occurrence of this operating sequence, and drives the actuator 23 by feedback control of the throttle opening so that the actual throttle opening turns to the limp home opening.

That is, the control apparatus 1 sets the target opening to the limp home opening based on occurrence of this operating sequence even when no abnormality is detected.

On the other hand, when abnormality is detected, an abnormality flag is set, and the throttle opening is set to the limp home opening.

Therefore, the control to set the throttle opening to the limp home opening is not related with presence of detected abnormality.

Thus, even when no abnormality is detected in the system, the throttle opening can be converged to the limp home opening, thereby not only decelerating the vehicle, but also securing output to a degree that allows retreat traveling of the vehicle.

Further, setting the throttle opening to the limp home opening when no abnormality is detected is restricted to the operating sequence that a brake operation is performed while the accelerator is operated. Accordingly, output control would not be performed during starting on a sloping road or the like, thereby securing driving operability.

The brake operation detecting unit 31 includes the brake switch 16 provided on the brake pedal and the cylinder pressure detecting unit 20. The cylinder pressure detecting unit 20 detects the pressure of fluid filled in the brake cylinder provided in connection to the brake pedal as a brake cylinder pressure. Then the brake operation detecting unit 31 determines that a brake operation is added when either of following conditions is met: an ON output signal of the brake switch 16 provided on the brake pedal occurs; and as a result of comparison with a preset brake operation determining threshold, the brake cylinder pressure is higher than the brake operation determining threshold.

The brake switch 16 detects a pressing operation of the brake pedal. This brake pedal has a small play, and thus even in a state there is a slight pressing operation which does not cause an actual braking force, this operation is detected.

On the other hand, the cylinder pressure detecting unit 20 detects the pressure of fluid filled in the brake cylinder provided in connection to the brake pedal as a brake cylinder pressure. This detection occurs in a state that the pressing operation is performed in some degree and an actual braking force is generated. Thus, determination of this pressure, that is, brake cylinder pressure>brake operation determining threshold B is to detect an actual braking state in some degree. The brake operation determining threshold B can also be referred to as a "brake cylinder pressure condition". In addition, as a brake cylinder pressure signal, information used for the electronic stability control device 19 which is a control device having a brake control function, a not-illustrated anti-lock brake system (also called "ABS), or the like may be used.

Thus, the brake operation detecting means 31 is a duplex system, thereby achieving a fault-tolerant system.

Further, either when abnormality is detected or when there is a trouble that the system is unable to detect abnormality, the throttle opening can be set to the limp home opening. Accordingly, there is achieved a system that does not require the driver to perform a special operation.

In the structure to determine that a brake operation is added when either of the following conditions is met: an ON output signal of the brake switch 16 provided on the brake pedal occurs; and as a result of comparison with a preset brake operation determining threshold B, the brake cylinder pressure is higher than the brake operation determining threshold B, the timings that the condition of the brake switch 16 and the condition of the brake cylinder pressure are satisfied or not are slightly different from each other.

Normally, the period of time in which the condition of the brake switch 16 is met is longer.

That is, as illustrated *1 in FIG. 5, although illustrated by matching time with 2-1 for convenience, continuous decrease (gradient) becomes small, and thus time becomes long in practice.

However, by setting the value of the brake operation determining threshold B lower, it is possible to approximate determination on a signal of the brake cylinder pressure to determination on the signal of the brake switch 16.

That is, as illustrated *2 in FIG. 5, an ON output signal of brake switch 17 is outputted by slight pedal operation, whereas cylinder pressure is always in smaller range because it is reflection of actual operation. It is possible to approximate to A by decreasing value of B.

An example of the case where a brake operation is being performed first and the accelerator pedal 10 is pressed down subsequently, and thereby the both pedals are operated simultaneously, is starting the vehicle on a sloping road. In this case, a flag of simultaneous operations would not be set, and thus the throttle opening would not be restricted toward the limp home opening. Therefore, output corresponding to the operation can be obtained, thereby securing good operability.

A condition for releasing the control to the limp home opening is met when one of the following three conditions is not satisfied:

(1) Accelerator opening condition such that the relation between the accelerator opening of the accelerator pedal 10 and an accelerator opening condition A is
accelerator opening>accelerator opening condition A;
(2) ON condition of the brake switch 16; and
(3) Brake cylinder pressure condition such that the relation between the brake cylinder pressure and the brake operation determining threshold B is
brake cylinder pressure>brake operation determining threshold B.

Then, the system returns to the throttle control based on the accelerator opening.

The 'accelerator opening condition A' is a threshold, and opening that the vehicle cannot stop promptly when accelerator pedal and brake pedal are operated simultaneously while in motion. The 'accelerator opening condition A' is an eigenvalue of each vehicle.

When the condition for performing the control to the limp home opening is met, the throttle opening is decreased gradually with a predetermined gradient so that the throttle opening by throttle control based on the accelerator opening turns to the limp home opening.

The 'gradient' means decreasing amount of throttle opening per unit time.

Conversely, when the condition for releasing the control to the limp home opening is met (also called "not satisfying the execution condition"), the throttle opening is gradually increased with a predetermined gradient so that the limp home opening turns to the throttle opening by throttle control based on the accelerator opening.

When the gradient for performing this gradual decrease or increase is the same as that in the conventional case of full closing, a required time for converging to a target opening (gradual decrease or increase to be completed) is reduced as a matter of course.

In the first embodiment described above, the structure in which a motor is used as an example of one actuator 23 is disclosed. However, a structure to use a different mechanical driving unit for forcibly causing convergence to the limp home opening may be employed.

In this case, setting the target opening to the limp home opening is not mandatory. With the target opening being in a suspended state, the limp home opening may be set forcibly.

A driving condition in place of an abnormality detection signal (also called "abnormality detection information"), a limp home opening signal similar to this signal may be set.

Figure 4:
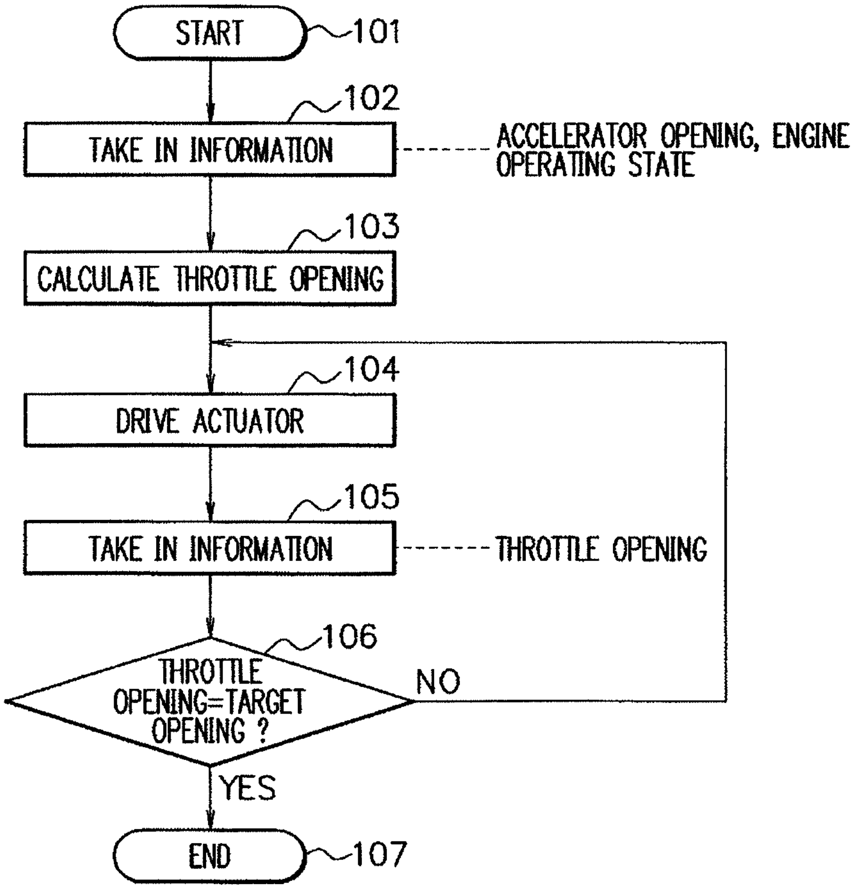
FIG. 4 is a control flowchart of the electronic throttle system (first embodiment)

Operations will be described along a control flowchart of the electronic throttle system 8 in FIG. 4.

When a control program of this electronic throttle system 8 is started (step 101), the system proceeds to processing of taking in information related to the accelerator opening and the engine operating condition (step 102).

After this processing of taking in information (step 102), the system proceeds to processing of throttle opening calculation (step 103).

At this time, the result of the first embodiment is reflected on either of the above-described processing of taking in information (step 102) and the processing of the throttle opening calculation (step 103).

Further, to describe for reference, the result of a second embodiment which will be described subsequently is reflected on the processing of the throttle opening calculation (step 103).

After the processing of the throttle opening calculation (step 103), the system proceeds to processing of driving the actuator 23 which is a throttle motor (104), and thereafter proceeds to processing of taking in information related to the throttle opening (step 105).

After the processing of taking in information related to the throttle opening (step 105), the system then proceeds to determination of whether or not the throttle opening is equal to the target opening, that is, throttle opening=target opening (step 106).

When this determination (step 106) is NO, the system returns to the above-described processing of driving the actuator 23 which is a throttle motor 104). When the determination (step 106) is YES, the system proceeds to end of the control program of the electronic throttle system 8 (step 107).

Figure 1:
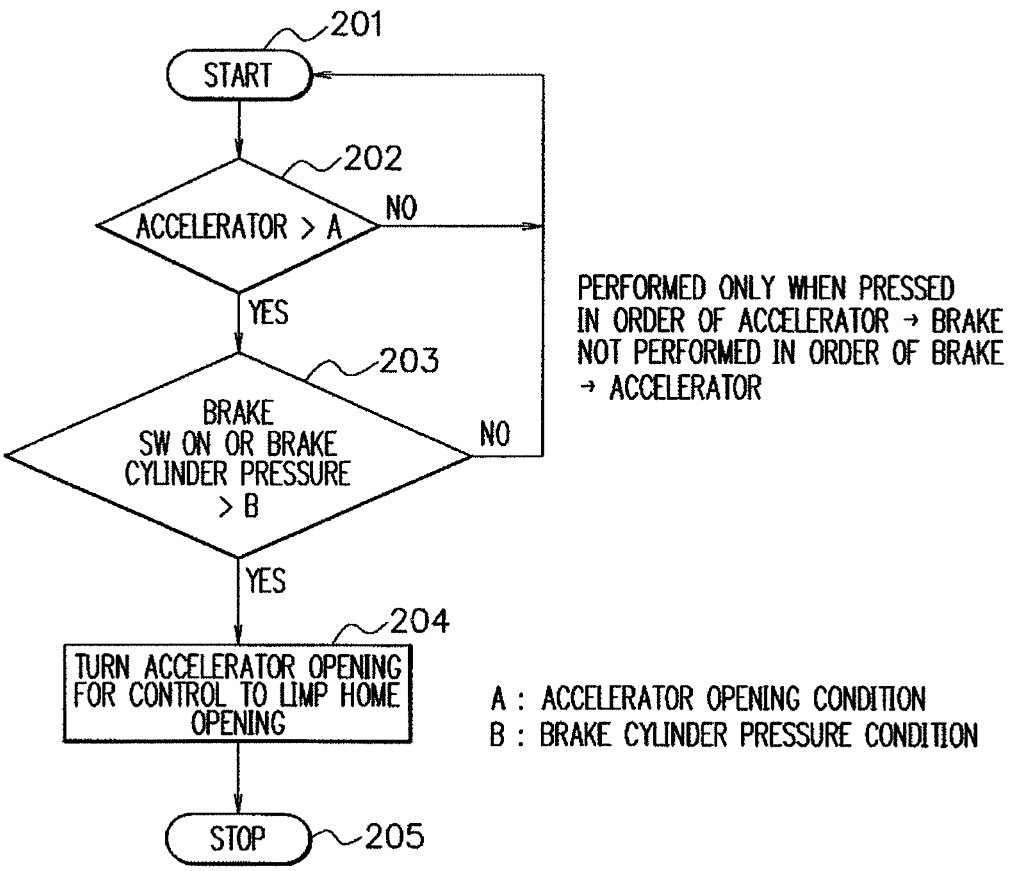
FIG. 1 is a control flowchart of a control apparatus of an internal combustion engine illustrating a first embodiment of the present invention (first embodiment)

Next, operations will be described along a control flowchart of the control apparatus 1 of the internal combustion engine 2 in FIG. 1.

When the control program of the control apparatus 1 of this internal combustion engine 2 is started (step 201), the system proceeds to determination of whether or not the relation between the accelerator opening of the accelerator pedal 10 and the accelerator opening condition A is accelerator opening>accelerator opening condition A (step 202).

When this determination (step 202) is NO, the system returns to the start (step 201) and repeats the determination (step 202) until the determination (step 202) becomes YES.

When the determination (step 202) is YES, the system proceeds to determination of whether either of the following conditions is met: a condition that the brake switch 16 is ON and the relation between the brake cylinder pressure and the brake operation determining threshold B is brake cylinder pressure>brake operation determining threshold B (step 203).

When the determination (step 203) is NO, the system returns to the start (step 201) and performs the determination (step 202).

In short, the control to the limp home opening is performed only when a brake operation is added in the order that the brake operation is after an accelerator operation. When the order is reversed and the accelerator operation is added after the brake operation, the control is not performed.

Furthermore, when a brake operation is added in the order that the brake operation is after an accelerator operation and the control is performed, and the determination (step 203) is YES, the target opening for control (also called "accelerator opening for control") is set to the limp home opening, and the system proceeds to processing to drive the actuator 23 so that the throttle opening turns to the limp home opening (step 204). Thereafter, the system proceeds to end of the control program of the control apparatus 1 of the internal combustion engine 2 (step 205).

—Second Embodiment—

Figure 6:
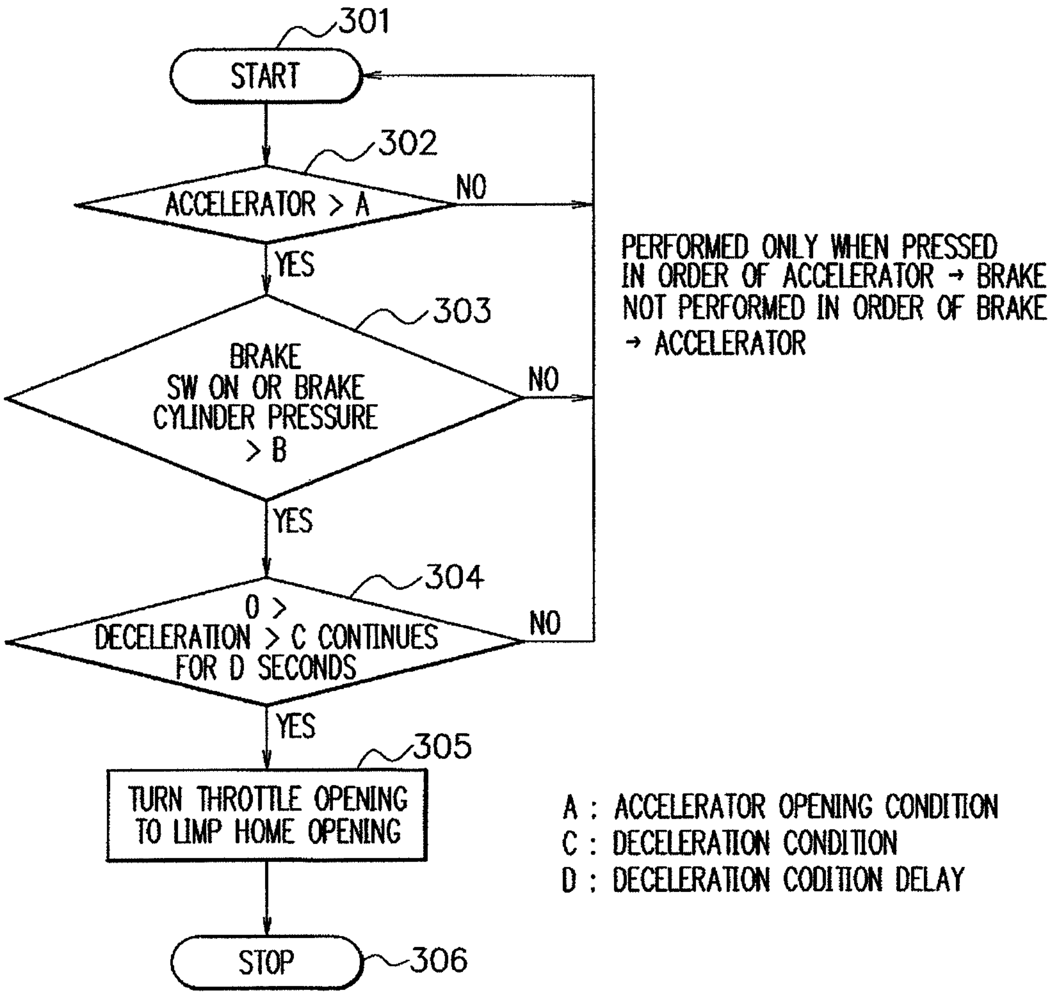
FIG. 6 is a control flowchart of a control apparatus of an internal combustion engine illustrating a second embodiment of the present invention.
Figure 7:
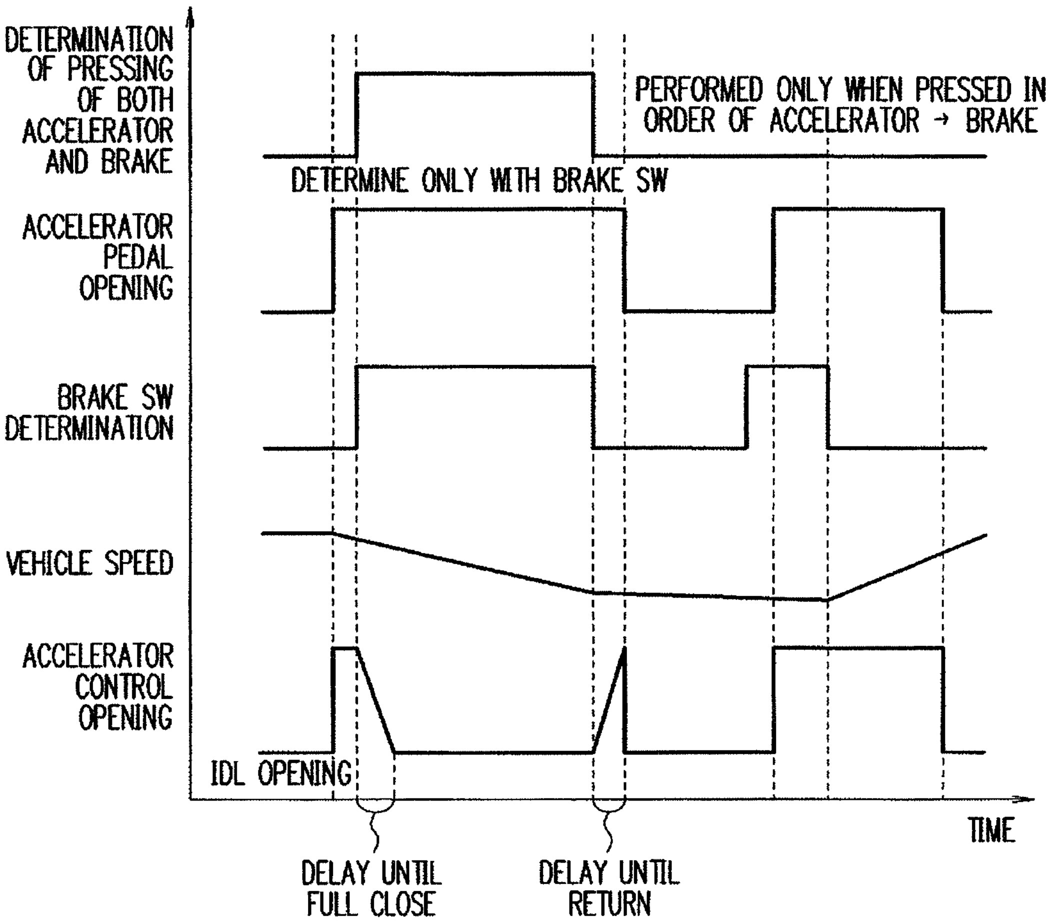
FIG. 7 is a time chart of a control apparatus of an internal combustion engine illustrating a conventional art related to the present invention.

FIG. 6 illustrates a second embodiment of the present invention.

In this second embodiment, parts performing the same function as in the above-described first embodiment are given the same reference numerals for description.

This second embodiment is characterized in that there is added to the control apparatus 1 a function to monitor a deceleration of the vehicle when a brake operation is added after the accelerator pedal is operated, and turn the throttle opening to the limp home opening when a decelerating state in a preset range continues for a predetermined time or longer.

That is, the control apparatus 1 monitors the deceleration of the vehicle when a brake operation is added subsequently while the accelerator pedal is operated. The control apparatus 1 has a structure such that when the decelerated state in the preset range continues for a predetermined time D or longer, the actuator is driven to turn the throttle opening to the limp home opening.

At this time, the deceleration is a negative value calculated by differentiation of the traveling speed of the vehicle (in addition, a positive value is an acceleration). The deceleration state in the preset range is determined by whether it is a desired deceleration state where 0>deceleration>C is true. C denotes a determination value for the deceleration state which is arbitrarily set. Accordingly, it is also possible that conversely the C is a small negative value, and the throttle opening is set so as not to be limited to the limp home opening when there is a large deceleration exceeding C.

A duration from when the deceleration state is determined is measured, and it is determined whether or not the duration is equal to or longer than the predetermined time D. Thus, a delay time is given to the operation to limit the throttle opening to the limp home opening. In this delay time, a wrong operation or a driving approach to slightly adjust the speed or to make an opportunity of changing the vehicle posture can be included, thereby improving the drivability.

Therefore, a brake operation for a short time or an operation to the degree of touching lightly does not cause the operation to turn to the limp home opening, and thus the two operations can be used properly.

In this proper use of the two operations, a wrong operation or the like can be included, which increases usefulness and improves driving operability.

Further, an actual operation of the brake can be detected only with a brake cylinder force.

However, the reason for monitoring the deceleration without performing it is to place importance on securing reliability and securing control accuracy.

Next, operations will be described along a control flowchart of the control apparatus 1 of the internal combustion engine 2 in FIG. 6.

When a control program of the control apparatus 1 of this internal combustion engine 2 is started (301), the system proceeds to determination of whether or not the relation between the accelerator opening of the accelerator pedal and the accelerator opening condition A is accelerator opening>accelerator opening condition A (302).

When this determination (302) is NO, the system returns to the start (301) and repeats the determination (302) until the determination (302) becomes YES.

When the determination (302) is YES, the system proceeds to determination of whether either of the following conditions is met: a condition that the brake switch 16 is ON and the relation between the brake cylinder pressure and the brake operation determining threshold B is brake cylinder pressure>brake operation determining threshold B (step 303).

When the determination (step 303) is NO, the system returns to the start (step 301) and performs the determination (step 302).

In short, the control to the limp home opening is performed only when a brake operation is added in the order that the brake operation is after an accelerator operation. When the order is reversed and the accelerator operation is added after the brake operation, the control is not performed.

Furthermore, when a brake operation is added in the order that the brake operation is after an accelerator operation and the control is performed, and the determination (step 303) is YES, the system proceeds to determination of whether or not the deceleration state in the following preset range 0>deceleration>C continues for a predetermined time D or longer (304).

When this determination (step 304) is NO, the system returns to the start (step 301) and performs the determination (step 302).

When this determination (304) is YES, the deceleration condition and the deceleration condition delay are satisfied, and thus the system proceeds to processing of driving the actuator so that the throttle opening turns to the limp home opening (305), and thereafter proceeds to end of the control program of the control apparatus of the internal combustion engine (306).

According to the present invention, in the control apparatus of the internal combustion engine having an electronic throttle system driving an actuator so that a throttle valve provided in the internal combustion engine is at a target opening according to plural driving conditions including an operating amount of an accelerator pedal, a throttle opening is turned to a limp home opening when abnormality is detected in any one of the driving conditions so as to allow retreat traveling of a vehicle. The control apparatus of the internal combustion engine includes a brake operation detecting unit detecting an intentional brake operation, in which when a brake operation is added subsequently while the accelerator pedal is operated, the control apparatus sets the target opening to the limp home opening based on occurrence of a sequence of the operations, and drives the actuator so that the throttle opening turns to the limp home opening, regardless of whether abnormality is detected or not.

Therefore, even when no abnormality is detected in the system, the throttle opening can be converged to the limp home opening, thereby not only decelerating the vehicle, but also securing output to a degree that allows retreat traveling of the vehicle.

Further, control of the throttle opening to the limp home opening is restricted only to the case where the operating sequence that a brake operation is performed while the accelerator is operated occurs. Accordingly, output control would not be performed during starting on a sloping road or the like, thereby securing driving operability.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A control apparatus of an internal combustion engine having an electronic throttle system, wherein the electronic throttle system drives an actuator so that a throttle valve provided in the internal combustion engine is at a target opening according to plural driving conditions, the plural driving conditions including an operating amount of an accelerator pedal, wherein a throttle opening is turned to a limp home opening when abnormality is detected in the driving conditions so as to allow retreat traveling of a vehicle, the control apparatus comprising:

a brake operation detecting unit that detects an intentional brake operation, wherein when the brake operation is added subsequently while the accelerator pedal is operated, the control apparatus sets the target opening to the limp home opening based on occurrence of a sequence of the operations, and drives the actuator so that the throttle opening turns to the limp home opening, regardless of whether abnormality is detected or not.

2. The control apparatus of the internal combustion engine according to claim 1, wherein the control apparatus monitors a deceleration of the vehicle when the brake operation is added subsequently while the accelerator pedal is operated, and when a deceleration state in a preset range continues for a predetermined time or longer, the control apparatus turns the throttle opening to the limp home opening.

3. The control apparatus of the internal combustion engine according to claim 2, wherein the brake operation detecting unit comprises a brake switch provided on a brake pedal, and a cylinder pressure detecting unit that detects a pressure of fluid in a brake cylinder connected to the brake pedal as a brake cylinder pressure, and the brake operation detecting unit determines that the brake operation is added when either of the following conditions is met: an ON output signal of the brake switch provided on the brake pedal occurs; and as a result of comparison with a preset brake operation determining threshold, the brake cylinder pressure is higher than the brake operation determining threshold.

4. The control apparatus of the internal combustion engine according to claim 1, wherein the brake operation detecting unit comprises a brake switch provided on a brake pedal, and a cylinder pressure detecting unit that detects a pressure of fluid in a brake cylinder connected to the brake pedal as a brake cylinder pressure, and the brake operation detecting unit determines that the brake operation is added when either of the following conditions is met: an ON output signal of the brake switch provided on the brake pedal occurs; and as a result of comparison with a preset brake operation determining threshold, the brake cylinder pressure is higher than the brake operation determining threshold.

* * * * *